(12) United States Patent
Amend et al.

(10) Patent No.: US 10,699,075 B2
(45) Date of Patent: *Jun. 30, 2020

(54) APPARATUS AND METHOD FOR IDENTIFYING TEXT THAT DOES NOT MATCH EXACTLY USING DUAL AUTHENTICATION

(71) Applicant: Bottomline Technologies (DE), Inc., Portsmouth, NH (US)

(72) Inventors: Brian Amend, Rye, NH (US); Sean Glerum, Portsmouth, NH (US); Melissa Kutsch, Portsmouth, NH (US); Jessica Moran, Rye, NH (US)

(73) Assignee: Bottomline Technologies, Inc, Portsmouth, NH (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/256,555

(22) Filed: Jan. 24, 2019

(65) Prior Publication Data
US 2019/0155903 A1    May 23, 2019

Related U.S. Application Data

(63) Continuation of application No. 15/172,571, filed on Jun. 3, 2016, now Pat. No. 10,235,356.

(51) Int. Cl.
*G06F 3/00* (2006.01)
*G06F 40/289* (2020.01)
*G06F 40/166* (2020.01)
*G06F 40/189* (2020.01)
*G06F 40/194* (2020.01)
*G06F 40/232* (2020.01)
*G06K 9/00* (2006.01)

(52) U.S. Cl.
CPC .......... *G06F 40/289* (2020.01); *G06F 40/166* (2020.01); *G06F 40/189* (2020.01); *G06F 40/194* (2020.01); *G06F 40/232* (2020.01); *G06K 9/00* (2013.01)

(58) Field of Classification Search
CPC ...... G06F 17/2211; G06F 17/24; G06F 17/25; G06F 40/289; G06F 40/166; G06F 40/189; G06F 40/194; G06F 40/232; G06K 9/00
See application file for complete search history.

(56) References Cited

U.S. PATENT DOCUMENTS

| | | |
|---|---|---|
| 5,600,835 A | 2/1997 | Garland |
| 6,845,369 B1 | 1/2005 | Rodenburg |
| 2009/0174667 A1 | 7/2009 | Kocienda |
| 2015/0039473 A1 | 2/2015 | Hu |
| 2016/0041984 A1 | 2/2016 | Kaneda |
| 2017/0039219 A1 | 2/2017 | Acharya |

*Primary Examiner* — Kyle R Stork
(74) *Attorney, Agent, or Firm* — Richard A. Baker, Jr.

(57) ABSTRACT

A computer-implemented method for matching user inputted text to stored text. The user inputted text is compared to each of the text strings stored in a database using a Levenshtein distance algorithm. For each comparison, the Levenshtein distance is analyzed to determine exact matches, non-matches, and probable matches. Probable matches are further analyzed using a keyboard distance algorithm to differentiate between matches and non-matches.

20 Claims, 3 Drawing Sheets

APPARATUS AND METHOD FOR IDENTIFYING TEXT THAT DOES NOT MATCH EXACTLY USING DUAL AUTHENTICATION

PRIOR APPLICATION

This application is a continuation of U.S. patent application Ser. No. 15/172,571, filed by Brain Amend et al on Jun. 3, 2016, titled "Dual Authentication Method for Identifying Non-Exactly Matching Text", the entire application hereby incorporated by reference.

BACKGROUND

Technical Field

The present invention relates to artificial intelligence, data processing, and, more particularly, to a method and system for identifying non-exactly matching text in electronic data.

Background of the Invention

Comparison of human entered data to stored electronic data occurs frequently in many different industries. For example, patients fill out forms when entering walk in facilities (e.g., an emergency room) and these paper forms are later entered into an electronic database. Entry of information contained in forms that were filled out by hand is frequently error prone due to numerous factors. For example, the information may be incorrectly filled out (e.g., misspellings, etc.) or the individual entering the information may not be able to read the information written on the form (e.g., due to the handwriting of the individual that filled out the form).

Incorrectly entering text into a database may result in duplicate entries for one individual in a database. For example, if there already exists an entry for Jonathan Smith at 123 Main Street and information is entered for Jon Smith at 123 Main Street, then a new user entry may mistakenly be added to the database instead of using the existing entry for Jonathan Smith at 123 Main Street. This may cause database errors or inconsistencies in the future.

SUMMARY OF THE INVENTION

Current methods for matching user inputted data to stored data are insufficient at differentiating between new entries to a database and existing database entries that are spelled differently, use abbreviations, etc. A new method is needed for matching user inputted data to stored data.

The present disclosure provides a computer-implemented method for matching user inputted text to stored text using a dual authentication method based on a Levenshtein distance algorithm and a keyboard distance algorithm.

According to one aspect, there is provided a computer-implemented method for matching user inputted text to stored text. The method includes: receiving the user inputted text, accessing a database including a plurality of text strings and stored on a non-transitory computer readable medium, and comparing the user inputted text to the plurality of text strings to determine potential matches between the user inputted text and the plurality of text strings. The comparing includes, for each text string of the plurality of text strings, determining a Levenshtein distance between the user inputted text and the text string. A Levenshtein distance of zero indicates that the user inputted text and the text string are an exact match and a Levenshtein distance greater than zero indicates that the user inputted text and the text string are not an exact match and the number of differences between the text string and the user inputted text. When the determined Levenshtein distance is greater than zero but less than a maximum difference threshold, at least one character differing between the user inputted text and the text string is determined. The determined at least one differing character includes a mismatching character pair including a mismatching character in the text string and a corresponding mismatching character in the user inputted text. For each mismatching character pair, a keyboard distance between the mismatching character in the text string and the corresponding mismatching character in the user inputted text is determined. The keyboard distance corresponds to a physical distance on a keyboard between the two mismatching characters. When the keyboard distance determined for each mismatching character pair is less than a maximum keyboard distance threshold, the user inputted text and the text string are identified as a match. When the determined Levenshtein distance is zero, the user inputted text and the text string are identified as a match. When the determined Levenshtein distance is greater than the maximum difference threshold, the text string is identified as not a match to the user inputted text. The method also includes outputting information regarding whether the user inputted text matches any of the plurality of text strings.

Alternatively or additionally, during comparison of the user inputted text and the plurality of text strings, the user inputted text and the text string are segmented into individual words and the Levenshtein distance is determined for the individual words separately.

Alternatively or additionally, the Levenshtein distance is determined for each word of the user inputted text with respect to each word of the text string to determine an optimal matching of the words in the user inputted text to the words in the text string such that the sum of the Levenshtein distance for the optimal matching is a minimum compared to the sum of the Levenshtein distance for other matching of the user inputted text and the text string.

Alternatively or additionally, the determining the optimal matching including combining one or more of the words in the user inputted text and the words in the text string.

Alternatively or additionally, the user inputted text and each of the plurality of text strings include multiple strings corresponding to multiple fields. Each string of the multiple strings corresponds to a field of the multiple fields. Comparing the user inputted text to the plurality of text strings includes comparing the user inputted text in a given text field to the text string in the same given text field.

Alternatively or additionally, the maximum difference threshold and/or the maximum keyboard distance threshold is increased based on the number of different fields in which a match is found between the user inputted text and the text string.

Alternatively or additionally, the method also includes accessing a secondary database storing a plurality of synonyms stored on the non-transitory computer readable medium. Each synonym comprises a replacement string corresponding to a main string. Comparing the user inputted text and the text string further includes generating at least one replacement text string. The at least one replacement text string is generated by replacing at least one portion of the text string that matches a main string with the corresponding replacement string. The user inputted text and the text string are determined to match if the user inputted text matches either the stored text or the at least one replacement text string.

Alternatively or additionally, the user inputted text and each of the plurality of text strings include multiple strings corresponding to multiple fields. Each string of the multiple strings corresponds to a field of the multiple fields. Comparing the user inputted text to the plurality of text strings includes comparing the user inputted text in a given text field to the text string in the same given text field. When a total number of fields in which an exact match is found between the user inputted text, any field in which the user inputted text is determined to match the text string and the match is not an exact match, the user inputted text for the field is stored as a synonym for the text string for the field.

Alternatively or additionally, prior to identifying the user inputted text and the text string as a match when the keyboard distance determined for each mismatching character pair is less than the maximum keyboard distance threshold, determining whether a sum of all of the keyboard distances determined for each mismatching character pair is less than a maximum total keyboard distance threshold and, only when the sum of all of the keyboard distances is less than the maximum total keyboard distance threshold, identifying the user inputted text and the text string as a match.

Alternatively or additionally, for a given mismatching character pair, either the mismatching character in the text string or the corresponding mismatching character in the user inputted text comprises a missing character.

Alternatively or additionally, for the given mismatching character pair including the missing character and a non-missing character, the keyboard distance between the missing character and the non-missing character comprises the distance between the non-missing character and a character adjacent to the non-missing character. The adjacent character is from the user inputted text when the non-missing character is from the user inputted text or the text string when the non-missing character is from the text string.

Alternatively or additionally, the keyboard distance between the non-missing character and the adjacent character comprises the minimum of the distance between the non-missing character and a character immediately preceding the non-missing character or a character immediately following the non-missing character.

Alternatively or additionally, for the given mismatching character pair including the missing character and a non-missing character, the keyboard distance between the missing character and the non-missing character is set equal to a predetermined value.

Alternatively or additionally, the comparison further includes, within the user inputted text, combining two characters into a single character to account for a user mistakenly hitting two keys when attempting to press one key when the two characters are located adjacent one another on the keyboard and the two characters are located adjacent to one another in the user inputted text.

Alternatively or additionally, the keyboard distance between the combined two characters and the other character in the mismatching character pair is equal to the minimum of: the keyboard distance between a first of the two combined characters and the other character in the mismatching character pair; and the keyboard distance between a second of the two combined characters and the other character in the mismatching character pair.

Alternatively or additionally, a capitalized character is split into two characters equal to the shift key and a lower case version of the capitalized character.

Alternatively or additionally, when the user inputted text is identified as a match to a particular text string of the plurality of text strings, data included with the user inputted text is stored as associated with the particular text string.

Alternatively or additionally, when the user inputted text is identified as not matching any of the plurality of text strings, storing the user inputted text as a new text string of the plurality of text strings.

Alternatively or additionally, data included with the user inputted text is stored as associated with the new text string.

Alternatively or additionally, when the determined Levenshtein distance is zero, identifying the user inputted text and the text string as an exact match and, when the determined Levenshtein distance is greater than zero but less than a maximum difference threshold and the keyboard distance determined for each mismatching character pair is less than a maximum keyboard distance threshold, identifying the user inputted text and the text string as a probable match.

Alternatively or additionally, the maximum difference threshold and/or the maximum keyboard distance threshold is adjusted based on the length of the user inputted text, such that user inputted text having a longer length has a larger maximum difference threshold and/or maximum keyboard distance threshold than user inputted text having a shorter length.

Alternatively or additionally, when the user inputted text and the text string are identified as a match, the comparing of the user inputted text to the plurality of text strings is stopped.

Alternatively or additionally, when the user inputted text and the text string are identified as a match, the comparing of the user inputted text to the plurality of text strings continues.

Alternatively or additionally, the case of the user inputted text and the text strings is ignored during comparison.

According to another aspect, there is provided a device for matching user inputted text to stored text. The device includes a non-transitory computer readable medium storing a database including a plurality of text strings and a processor. The processor is configured to: receive the user inputted text, access the database including the plurality of text strings, and compare the user inputted text to the plurality of text strings to determine potential matches between the user inputted text and the plurality of text strings. The comparing includes, for each text string of the plurality of text strings, determining a Levenshtein distance between the user inputted text and the text string. A Levenshtein distance of zero indicates that the user inputted text and the text string are an exact match and a Levenshtein distance greater than zero indicates that the user inputted text and the text string are not an exact match and the number of differences between the text string and the user inputted text. When the determined Levenshtein distance is greater than zero but less than a maximum difference threshold, at least one character differing between the user inputted text and the text string is determined. The determined at least one differing character comprises a mismatching character pair including a mismatching character in the text string and a corresponding mismatching character in the user inputted text. For each mismatching character pair, a keyboard distance between the mismatching character in the text string and the corresponding mismatching character in the user inputted text is determined. The keyboard distance corresponds to a physical distance on a keyboard between the two mismatching characters. When the keyboard distance determined for each mismatching character pair is less than a maximum keyboard distance threshold, the user inputted text and the text string are identified as a match. When the determined Levenshtein distance is zero, the user inputted text and the text string are identified as a match. When the determined Levenshtein distance is greater than the maximum keyboard difference threshold, the text string is identified as not a match to the user inputted text. The processor is also configured to output information regarding whether the user inputted text matches any of the plurality of text strings.

A number of features are described herein with respect to embodiments of this disclosure. Features described with respect to a given embodiment also may be employed in connection with other embodiments.

For a better understanding of the present disclosure, together with other and further aspects thereof, reference is made to the following description, taken in conjunction with the accompanying drawings. The scope of the disclosure is set forth in the appended claims, which set forth in detail certain illustrative embodiments. These embodiments are indicative, however, of but a few of the various ways in which the principles of the disclosure may be employed.

DETAILED DESCRIPTION OF THE INVENTION

Figure 1:
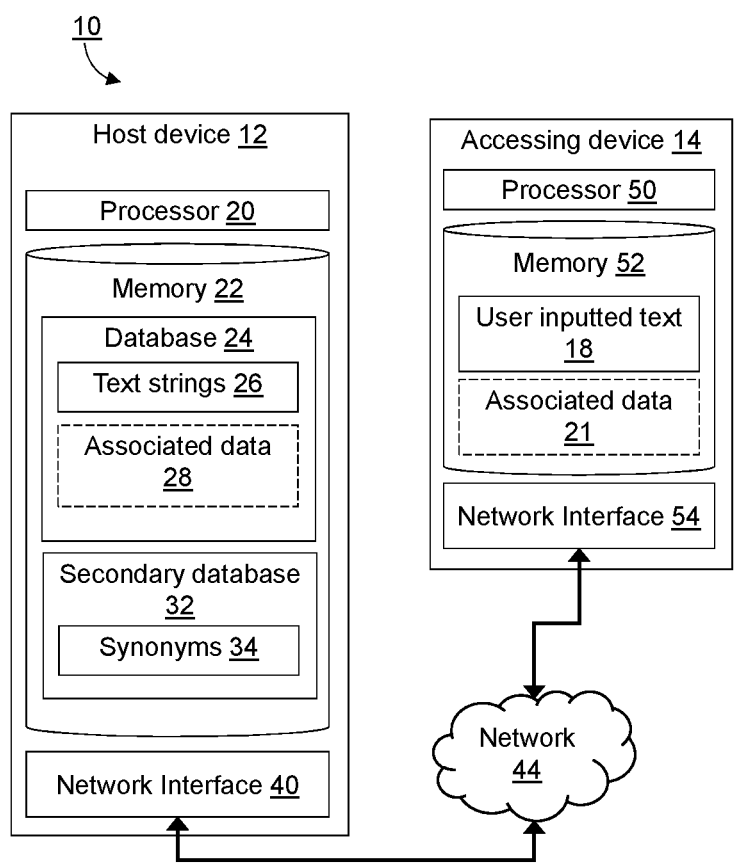
FIG. 1 is a block diagram representing a system for entering user inputted text into a database.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should be appreciated that many of the elements discussed in this specification may be implemented in a hardware circuit(s), a processor executing software code or instructions which are encoded within computer readable media accessible to the processor, or a combination of a hardware circuit(s) and a processor or control block of an integrated circuit executing machine readable code encoded within a computer readable media. As such, the term circuit, module, server, application, or other equivalent description of an element as used throughout this specification is, unless otherwise indicated, intended to encompass a hardware circuit (whether discrete elements or an integrated circuit block), a processor or control block executing code encoded in a computer readable media, or a combination of a hardware circuit(s) and a processor and/or control block executing such code.

A computer-implemented method for matching user inputted text to stored text is provided. The user inputted text is compared to each of the text strings stored in a database using a Levenshtein distance algorithm. For each comparison, the Levenshtein distance is analyzed to determine exact matches, non-matches, and probable matches. Probable matches are further analyzed using a keyboard distance algorithm to segment the probable matches into matches or non-matches.

FIG. 1 depicts a system 10 for matching user inputted text to stored text. The system 10 includes a host device 12 and an accessing device 14. The host device 12 includes a processor 20 and a memory 22 storing a database 24. The database 24 stores a plurality of text strings 26. The host device 12 may additionally include a network interface 40 for receiving user inputted text 18 from the accessing device 14 via a network 44.

The processor 20 of the host device 12 is configured to receive the user inputted text 18. As described above, the user inputted text 18 may be received by a network interface 40 of the host device 12. Alternatively, the user inputted text 18 may be inputted into the host device 12 via a keyboard (not shown) or using any suitable input device.

After receiving the user inputted text 18, the processor 20 is configured to access the database 24 including the plurality of text strings 24. In FIG. 1, the processor 20 and the memory 22 (that the database 24 is stored on) are components of the same host device 12. However, as will be understood by one of ordinary skill in the art, the database 24 may be stored on a separate device (e.g., a server) or in an external memory attached to the host device 12 (e.g., an external hard drive or network attached storage).

The processor 20 is configured to compare the user inputted text 18 to the plurality of text strings 26 stored in the database 24 to determine potential matches between the user inputted text 18 and the plurality of text strings 26. For each text string of the plurality of text strings 26, the processor 20 compares the user inputted text 18 to the text string 26 by determining a Levenshtein distance between the user inputted text 18 and the text string 26. A Levenshtein distance of zero indicates that the user inputted text 18 and the text string 26 are an exact match and a Levenshtein distance greater than zero indicates that the user inputted text 18 and the text string 26 are not an exact match. The number of differences between the text string 26 and the user inputted text 18 is indicated by the Levenshtein distance. As will be understood by one of ordinary skill in the art, when determining the Levenshtein distance, the case of the user inputted text 18 and the text strings 26 may be ignored.

Figure 2B:
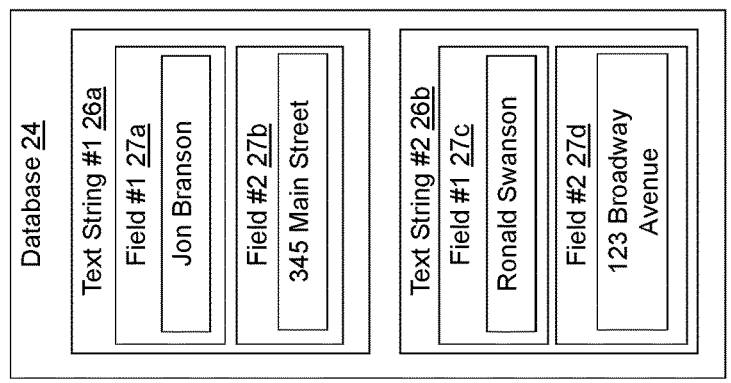
FIGS. 2A and 2B are examples of human entered text and text strings stored in a database.
Figure 2B:
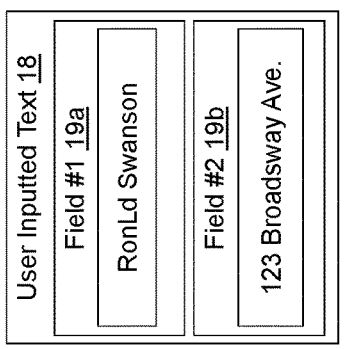
Figure 2A:
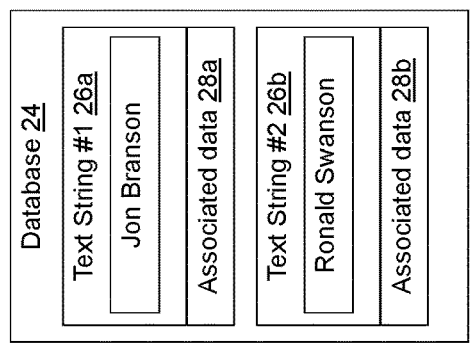
Figure 2A:
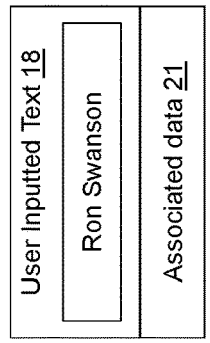

For example, FIG. 2A depicts the comparison of "Ron Swanson" to "Jon Branson" and "Ronald Swanson." The following text shows with underlines the three letters that are different in "Ron Swanson" and "Jon Branson": Ron Swanson; Jon Branson. Like "Jon Branson", "Ronald Swanson" also differs from "Ron Swanson" by three letters as shown with underlines in the following text: Ron Swanson; Ronald Swanson. In both of these examples, the Levenshtein distance between the user inputted text and the text strings is three.

As will be understood by one of ordinary skill in the art, while the above example increases the Levenshtein distance by one for each character mismatch, the Levenshtein distance may be determined in any suitable manner that represents the differences between the text string 26 and the user inputted text 18. For example, the Levenshtein distance may increase by 0.5 for mismatches between capital and lower case letters and 1.0 for all other mismatches.

It may be preferable to ensure that one missing character (e.g., "a" in "RonLd") does not result in the Levenshtein distance algorithm counting each character following the missing as not matching (e.g., "Ronald Swanson" and "Ron LdSwanson" could be determined to only match the first three characters, because the position of the characters in "Ld Swanson" does not match the position of any of the characters in "ald Swanson"). For this reason, during comparison of the user inputted text 18 and the plurality of text strings 26, the user inputted text 18 and the text string 26 may be segmented into individual words and the Levenshtein distance may be determined for the individual words separately.

It is possible that the user inputted text 18 may include errant spaces that mistakenly divide one word into two separate words and/or may be missing spaces (e.g., due to a user failing to hit the space key) that results in two words being presented as one word. For example, when typing "Ronald", a user may mistakenly push the space key instead of "n" and result in "Ro ald". For this reason, determining the optimal matching may additionally include combining one or more of the words in the user inputted text 18 and the words in the text string 26. For example, when comparing "Ronald Swanson" and "Ro ald Swanson", "Ronald" may be separately compared to each of "Ro", "ald", "Swanson", "Ro ald", "Ro ald Swanson", and "ald Swanson".

For the reasons described above, the Levenshtein distance may alternatively or additionally be determined for each word of the user inputted text 18 with respect to each word of the text string 26 to determine an optimal matching of the words in the user inputted text 18 to the words in the text string 26 such that the sum of the Levenshtein distance for the optimal matching is a minimum compared to the sum of the Levenshtein distance for other matching of the user inputted text 18 and the text string 26.

As shown in FIG. 2B, the user inputted text 18 and each of the plurality of text strings 26 may include multiple strings corresponding to multiple fields 19, 27, where each string of the multiple strings corresponds to a field of the multiple fields 19, 27. When multiple fields 19, 27 are present, comparing the user inputted text 18 to the plurality of text strings 26 may include comparing the user inputted text 18 in a given text field 19 to the text string in the same given text field 27. Fields not shared between the user inputted text 18 and a given text string 26 may be disregarded.

The maximum difference threshold and/or the maximum keyboard distance threshold may be increased based on the number of different fields in which a match is found between the user inputted text 18 and the text string 26.

When the Levenshtein distance is zero, the user inputted text 18 and the text string 26 are an exact match and the processor 20 is configured to identify the user inputted text 18 as a match with the text string 26. Alternatively, when the Levenshtein distance is greater than a maximum difference threshold, the processor 20 is configured to identify the text string 26 as not a match to the user inputted text 18.

The maximum difference threshold may be set as a predetermined number. Alternatively, the maximum difference threshold may be adjusted based on the number characters or the number of words in the user inputted text 18 or in the text string 26. For example, the maximum difference threshold may be adjusted based on the length of the user inputted text 18, such that user inputted text having a longer length has a larger maximum difference threshold than user inputted text 18 having a shorter length. As will be understood by one of ordinary skill in the art, the maximum difference threshold may be determined or varied in any suitable matter to adjust for the user inputted text 18 and the text string 26 being compared.

When the determined Levenshtein distance is greater than zero but less than a maximum difference threshold, the processor 20 is configured to determine the character(s) differing between the user inputted text 18 and the text string 26. Each of the determined differing characters comprise a mismatching character pair including a mismatching character in the text string 26 and a corresponding mismatching character in the user inputted text 18.

For each mismatching character pair, the processor 20 is configured to determine a keyboard distance between the mismatching character in the text string 26 and the corresponding mismatching character in the user inputted text 18. The keyboard distance corresponds to a physical distance on a keyboard between the two mismatching characters. For example, the "F" key and the "D" key may have a distance of one, because they are directly adjacent to one another on a standard QWERTY keyboard. Similarly, a "J" key and a "L" key may have a distance of two, because the two keys are separate by the "K" key.

Because the keyboard distance corresponds to a physical distance on a keyboard between the keys, the keyboard distance algorithm may receive as an input the layout of keys on the input device. The keyboard distance algorithm may use the layout of the keys in order to determine the keyboard distance between two keys.

The keyboard distance may be determined in any suitable manner. For example, the keyboard distance may be determined by counting the number of key movements required to move from one key to another, the physical distance between the two keys on a standard keyboard (e.g., in cm or inches), or using any suitable metric. As an example, to move to the "T" key from "W", three key movements are required (from "W" to "E", from "E" to "R", and from "R" to "T").

The keyboard algorithm may restrict movement between keys to exclude diagonal movement. Alternatively, the keyboard algorithm may allow diagonal movement between keys. For example, when comparing the "W" and "D" keys, if diagonal movement is not allowed, then the keys would be two key movements apart (from "W" to "S" and from "S" to "D"). Alternatively, if diagonal movement is allowed, then the "W" and "D" keys would only be one key movement apart (from "W" to "D").

The keyboard distance algorithm may also take into consideration whether the keys being compared are typed using the same finger. For example, the keyboard distance may be determined as described above and then multiplied by a weighting factor. The weighting factor for keys typed using the same finger may be lower than keys typed using a different finger. Additionally, the weighting factor may also increase based on the number of fingers between the fingers used to type the two compared keys. For example, the "r" key is typed with the left index finger and the "a" key is typed with the left pinky finger. The weight applied to this comparison may be larger than a weight used when comparing keys typed with the index finger and the middle finger.

Returning to the example in FIG. 2A, the Levenshtein distance between "Ron Swanson" and "Jon Branson" is three. If the maximum keyboard distance threshold is four, then the processor would determine the keyboard distance between the mismatching characters. When comparing "Ron Swanson" and "Jon Branson", the keyboard distance between "R" and "J" is three (assuming diagonal movement is used to determine the keyboard distance), the keyboard distance between "S" and "B" is three (again assuming that diagonal movement is used).

In some cases, the mismatching character pair may include a character and a missing character. For example, in FIG. 2B, "RonLd Swanson" is compared to "Ronald Swanson". In this example, the "a" in "Ronald" does not have a matching character in that "a" was left out of "RonLd" (presumably because the user accidentally hit the "shift key" instead of "a" resulting in a capital "L" instead of a lower case "l"). For this reason, for a given mismatching character pair, either the mismatching character in the text string 26 or the corresponding mismatching character in the user inputted text 18 may be a missing character.

When a missing character is one of the characters in the mismatching character pair, the keyboard distance between the missing character and the non-missing character comprises the distance between the non-missing character and a character adjacent to the non-missing character. The adjacent character may be from the user inputted text 18 when the non-missing character is from the user inputted text 18 or the text string 26 when the non-missing character is from the text string 26. For example, when comparing "Ronsald" and "Ronald", the mismatching character pair is a missing character and "s". In this example, the keyboard distance would be the keyboard distance between "s" and "n" or "a" (the adjacent characters in "Ronsald").

The keyboard distance between the non-missing character and the adjacent character may be the minimum of the distance between the non-missing character ("s" in the above example) and a character immediately preceding the non-missing character ("n" in the above example) or a character immediately following the non-missing character ("a" in the above example). In the above example, the keyboard distance would be the minimum of 5 (the keyboard distance between "n" and "s") and 1 (the keyboard distance between "a" and "s"). Using the keyboard distance between the non-missing character and the adjacent character can be used to compensate for a user accidentally hitting two characters ("sa" in the above example) instead of only one key ("a" in the above example).

Alternatively, the keyboard distance between the missing character and the non-missing character may be set equal to a predetermined value. For example, the predetermined value may be set equal to 1.0, 1.5, 2.0, 2.5, 3.0, or any suitable value.

In additional to or in the alternative to compensating for a user hitting two keys by using the keyboard distance algorithm (as described in the previous paragraphs), comparing the user inputted text 18 to one of the plurality of text strings 26 may include combining two characters within the user inputted text into a single character in order to account for a user mistakenly hitting two keys when attempting to press one key. The two characters may be combined when the two characters are located adjacent one another on the keyboard and when the two characters are located adjacent to one another in the user inputted text 18.

When combining two characters, the keyboard distance between the combined two characters and the other character in the mismatching character pair may be equal to the minimum of: the keyboard distance between a first of the two combined characters and the other character in the mismatching character pair and the keyboard distance between a second of the two combined characters and the other character in the mismatching character pair.

One character may also be split into two characters when comparing the user inputted text 18 to one of the plurality of text strings 26. For example, in FIG. 2B the user mistakenly hit the "shift key" instead of the "a" key when typing "Ronald", resulting in "RonLd" being stored in the user inputted text 18. For this reason, the comparing may include splitting a capitalized character into two characters equal to the "shift key" and a lower case version of the capitalized character ("l" in this example). In this example, the mismatching character pair would be the "shift key" (from "RonLd") and the "a" key (from "Ronald"). Alternatively, the case of the user inputted text 18 and the text strings 26 may be ignored.

When the keyboard distance determined for each mismatching character pair is less than a maximum keyboard distance threshold, the processor 20 is configured to identify the user inputted text 18 and the text string 26 as a match. The maximum keyboard distance threshold may be set to any suitable number. For example, the keyboard distance may be 1 or 2 if diagonal characters are used to determine the keyboard distance. Similarly, the keyboard distance may be 1, 2, or 3 if diagonal characters are not used to determine the keyboard distance.

The maximum keyboard distance threshold may be set as a predetermined number. Alternatively, the maximum keyboard distance threshold may be adjusted based on the number keys or the number of words in the user inputted text 18 or in the text string 26. For example, the maximum keyboard distance threshold may be adjusted based on the length of the user inputted text 18, such that user inputted text 18 having a longer length has a larger maximum keyboard distance threshold than user inputted text 18 having a shorter length. As will be understood by one of ordinary skill in the art, the maximum keyboard distance threshold may be determined or varied in any suitable matter to adjust for the user inputted text 18 and the text string 26 being compared.

In one embodiment, prior to identifying the user inputted text 18 and the text string 26 as a match when the keyboard distance determined for each mismatching character pair is less than the maximum keyboard distance threshold, the processor 20 may determine whether a sum of all of the keyboard distances determined for each mismatching character pair is less than a maximum total keyboard distance threshold. Only when the sum of all of the keyboard distances is less than the maximum total keyboard distance threshold, then the processor may identify the user inputted text 18 and the text string 26 as a match. As described above regarding the maximum keyboard distance threshold, the maximum total keyboard distance threshold may be set as a predetermined number, it may be adjusted based on the number keys or the number of words in the user inputted text 18 or in the text string 26, or it may be set in any suitable manner.

After comparing the user inputted text 18 to the plurality of text strings 26, the processor 20 outputs information regarding whether the user inputted text 18 matches any of the plurality of text strings 26.

When the user inputted text 18 is identified as a match to a particular text string of the plurality of text strings 26, data 21 included with the user inputted text 18 is stored as data 28 associated with the particular text string 26.

The comparing of the user inputted text 18 to the plurality of text strings 26 may be stopped when the user inputted text 18 and one of the plurality of text strings 26 is identified as a match. Alternatively, the comparing of the user inputted text 18 to the plurality of text strings 26 may continue when the user inputted text 18 and the text string 26 are identified as a match. In this way, multiple matches may be found between the user inputted text 18 and the plurality of text strings 26. If multiple matches are found, a single text string of the matching text strings may be identified as a match and the remaining matching text strings may be identified as not a match. For example, the single text string of the matching text strings 26 identified as a match may be selected based on the sum of the keyboard distance, the Levenshtein distance, or a combination of the keyboard distance and the Levenshtein distance of the text string 26 and the user inputted text 18. As an example, the matching text string 26 having the lowest Levenshtein distance relative to the user inputted text 18 may be selected. If there is a tie where two matching text strings have the same Levenshtein distance that is the lowest of the matching text strings 26, the sum of the keyboard distance for the two matching text strings and the user inputted text 18 may be used as a tie breaker, such that the matching text string having the lowest keyboard distance of the two matching text strings may be selected as a match.

When the user inputted text 18 is identified as not matching any of the plurality of text strings 26, the user inputted text 18 may be stored as a new text string of the plurality of text strings 26. When storing user inputted text 18 as a new text string 26, data 21 associated with the user inputted text 18 may be stored as data 28 associated with the new text string 26.

As opposed to simply identifying a text string 26 as a match or not a match, a distinction may be made between an exact match and a probable match. That is, when the determined Levenshtein distance is zero, the user inputted text 18 and the text string 26 may be identified as an exact match. Similarly, when the determined Levenshtein distance is greater than zero and less than a maximum difference threshold and the keyboard distance determined for each mismatching character pair is less than a maximum keyboard distance threshold, the user inputted text and the text string may be identified as a probable match.

One problem with matching user inputted text 18 to stored text strings 26 is that the user inputted text 18 or the text strings 26 may include abbreviations or synonyms that cause issues during matching. For example, in FIG. 2A "Ron Swanson" is being compared to "Ronald Swanson". In order to ensure that "Ron" and "Ronald" are identified as a match (or an exact match), a secondary database 32 storing a plurality of synonyms 34 may be accessed by the processor 20. The secondary database 32 may be stored on the non-transitory computer readable medium 22. Each synonym 34 may include a replacement string corresponding to a main string.

When using the secondary database 32, as opposed to only comparing the user inputted text 18 and the text string 26, the comparison further includes generating at least one replacement text string. The at least one replacement text string is generated by replacing at least one portion of the text string 26 or user inputted text 18 that matches a main string of a synonym 34 with the corresponding replacement string stored in the synonym 34. For example, in FIG. 2A, "Ronald" in "Ronald Swanson" would be replaced with "Ron" to form "Ron Swanson" using a synonym specifying "Ronald" as a main string and "Ron" as a replacement string. The user inputted text 18 and the text string 26 are determined to match if the user inputted text 18 matches either the stored text 26 ("Ronald Swanson") or the at least one replacement text string ("Ron Swanson").

The secondary database 32 of synonyms 34 may be automatically generated. For example, the user inputted text 18 and each of the plurality of text strings 26 may include multiple strings corresponding to multiple fields 19, 27, where each string of the multiple strings corresponds to a field of the multiple fields 19, 27. In this case, comparing the user inputted text 18 to the plurality of text strings 26 includes comparing the user inputted text 18 in a given text field 19 to the text string 26 in the same given text field 27 of the text string 26. When a total number of fields 19, 27 in which an exact match is found between the user inputted text 18 and a text string 26, any field 19, 27 in which the user inputted text 18 is determined to match the text string 26, but the match is not an exact match, then the user inputted text 18 for the field is stored as a synonym 34 for the matching field 27 of the text string 26.

Figure 3:
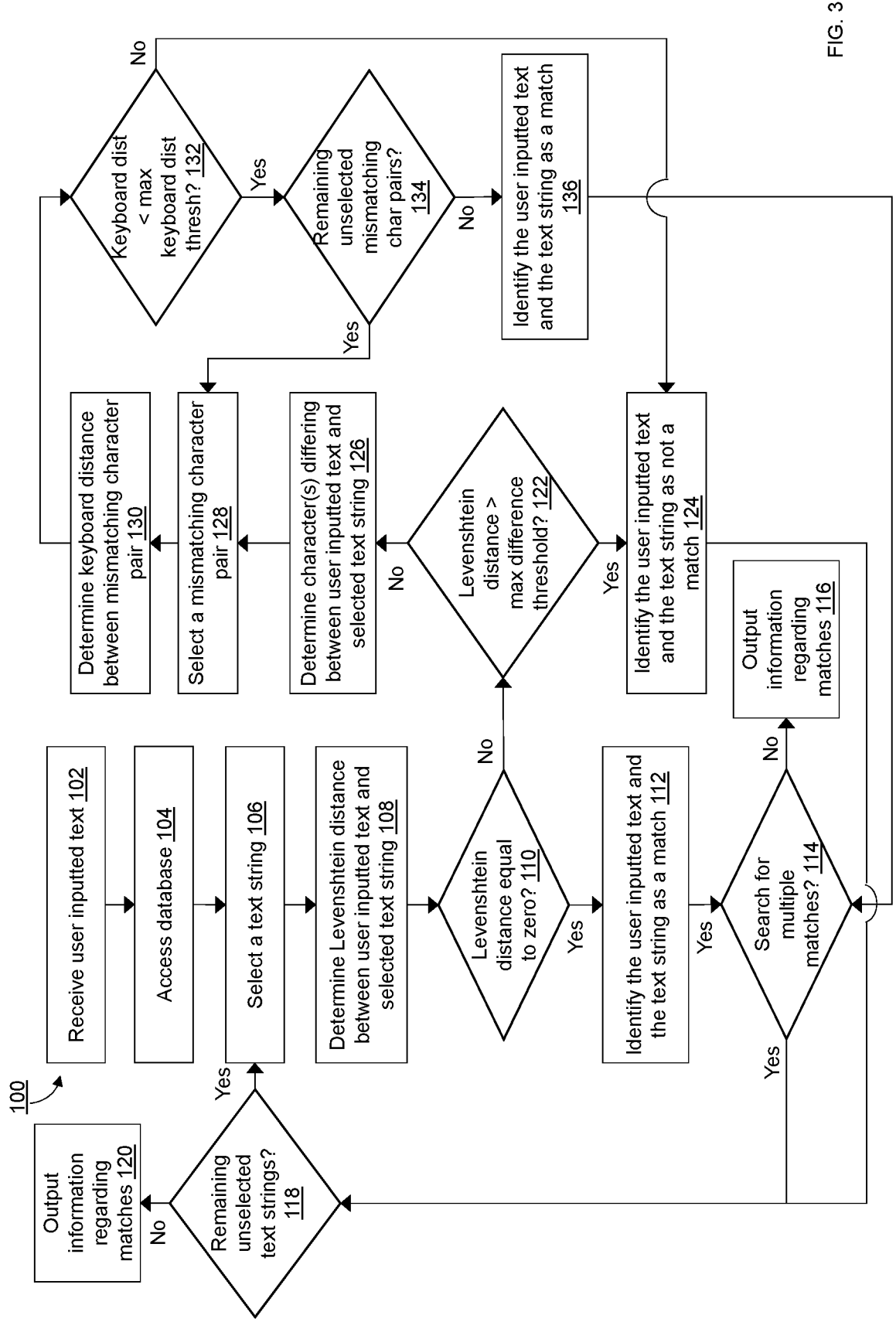
FIG. 3 is flow diagram representing a computer-implemented method for matching user inputted text to stored text.

Turning to FIG. 3, a block diagram is shown depicting a computer-implemented method 100 for matching user inputted text 18 to stored text 26. The computer-implemented method 100 may be performed by the host device 12 (e.g., the processor 20 of the host device 12).

In process block 102, the user inputted text 18 is received. In process block 104, the database 24 including the plurality of text strings 26 is accessed. In process block 106, comparing the user inputted text 18 to the plurality of text strings 26 to determine potential matches between the user inputted text 18 and the plurality of text strings 26 begins.

In process block 106, a text string 26 of the plurality of text strings 26 is selected. In process block 108, a Levenshtein distance between the user inputted text 18 and the selected text string 26 is determined. In decision block 110, it is determined whether the Levenshtein distance is equal to zero. If the Levenshtein distance is equal to zero, then processing continues to process block 112. In process block 112, the user inputted text 18 and the text string are identified as a match. As described above, the user inputted text 18 and the text string 26 may be identified as an exact match.

In decision block 114, it is determined whether the method is searching for multiple matches. If multiple matches are not being searched for, then information regarding whether the user inputted text 18 matches any of the plurality of text strings 26 is output in process block 116. If multiple matches are being searched for, then processing moves to decision block 118. In decision block 118, a determination is made regarding whether there remain any unselected text strings 26. If there are no remaining unselected text strings 26, then information regarding whether the user inputted text 18 matches any of the plurality of text strings 26 is output in process block 120. However, if there are remaining unselected text strings 26, then a new text string 26 is selected in process block 106.

If the Levenshtein distance is not equal to zero in decision block 110, then processing moves to decision block 122. In decision block 122, a check is made to determine if the Levenshtein distance is greater than the maximum difference threshold. If the Levenshtein distance is greater than the maximum difference threshold, then the text string 26 is identified as not a match to the user inputted text 18 in process block 124. Following process block 124, processing moves to decision block 118 to determine if there are any remaining unselected text strings 26 as described above.

If the Levenshtein distance is not greater than the maximum difference threshold in processing block 122, then the Levenshtein distance is greater than zero but less than the maximum difference threshold. In this case, processing moves to process block 126.

In process block 126, the computer-implemented method determines at least one-character differing between the user inputted text 18 and the text string 26. As described previously, the determined at least one differing character comprises a mismatching character pair including a mismatching character in the text string 26 and a corresponding mismatching character in the user inputted text 18. In process block 128, a mismatching character pair is selected. In process block 130, a keyboard distance between the mismatching character in the text string 26 and the corresponding mismatching character in the user inputted text 18 is determined.

In decision block 132, a check is performed to determine if the keyboard distance is less than the maximum keyboard distance threshold. If the keyboard distance is greater than or equal to the maximum keyboard distance threshold, then the user inputted text 18 and the text string are identified as not a match in process block 124. If the keyboard distance is less than the maximum keyboard distance threshold, then a check is performed in decision block 134 to determine if there are any remaining unselected mismatching character pairs. If there are any unselected mismatching character pairs, then a new mismatching character pair is selected in process block 128. If there are no remaining unselected mismatching character pairs, then the user inputted text 18 and the text string 26 are identified as a match in process block 136. Following process block 136, processing moves to decision block 114.

As will be understood by one of ordinary skill in the art, the host device 12 and/or accessing device 14 may be a computer system of one or more computers, servers, etc. The combination of the host device 12 and accessing device 14 may also be embodied as a single device (e.g., a single computer or server). The host device 12 and/or accessing device 14 may comprise a cellular phone, smart phone, tablet, mobile computer, desktop computer, laptop, or any other suitable computer apparatus capable of executing the method for matching user inputted text 18 to stored text. The host device 12 and the accessing device 14 each include at least a processor, a network interface, and non-transitory computer readable medium 22, 52. The computer readable medium 22, 52 may include encoded thereon instructions for interfacing with the corresponding network interface 40, 54 and reading and writing data to the corresponding computer readable medium 22, 52. The computer readable medium 22, 52 may also include computer programs comprising instructions embodied thereon that are executed by the corresponding processor 20, 50.

As will be understood by one of ordinary skill in the art, host device 12 and the accessing device 14 may communicate with one another using any suitable method. For example, the host device 12 and the accessing device 14 may communicate over a local area network (LAN), a Bluetooth Network, or the Internet.

Data (e.g., the user inputted text 18 and associated data 19) may be transferred over a network 44 connecting the host device 12 and the accessing device 14. The network 44 may be at least one of a TCP/IP network or a system bus. As will be understood by one of ordinary skill in the art, the transmission of data between the host device 12 and the accessing device 14 may be performed using any suitable protocol (e.g., TCP/IP, Bluetooth, SMTP, HTTP, SSL, PPP, IMAP, or any other suitable network protocol). The accessing device 14 may also comprise a keyboard or similar input device connected to the host device 12.

As will be understood by one of ordinary skill in the art, the processors 20, 50 of the host device 12 and accessing device 14 may have various implementations. For example, each of the processors 20, 50 may include any suitable device, such as a programmable circuit, integrated circuit, memory and I/O circuits, an application specific integrated circuit, microcontroller, complex programmable logic device, other programmable circuits, or the like. Each of the processors 20, 50 may also include a non-transitory computer readable medium, such as random access memory (RAM), a read-only memory (ROM), an erasable programmable read-only memory (EPROM or Flash memory), or any other suitable medium. Instructions for performing the methods described above may be stored in the non-transitory computer readable medium and executed by the respective processor 20, 50 identified in the description of the method. Each of the processors 20, 50 may be communicatively coupled to the respective computer readable medium 22, 52 and network interface 40, 54 through a system bus, mother board, or using any other suitable structure known in the art.

The network interfaces 40, 54 of the host device 12 and accessing device 14 may each be communicatively coupled to one or more other host devices 12 and accessing devices 14. The network 44 may be an open network, such as the Internet, a private network, such as a virtual private network, or any other suitable network. Each of the network interface 40, 54 may be configured to transmit and/or receive data.

As will be understood by one of ordinary skill in the art, each of the network interfaces 40, 54 may comprise a wireless network adaptor, an Ethernet network card, or any suitable device for performing network based communication between devices. Each of the network interfaces 40, 54 may be communicatively coupled to the respective computer readable medium 22, 52 such that each network interface 40, 54 is able to send data stored on the respective computer readable medium 22, 52 across the network 44 and store received data on the respective computer readable medium 22, 52. Each of the network interface 40, 54 may also be communicatively coupled to the respective processor 20, 50 such that the processor is able to control operation of the network interface 40, 54. The respective network interfaces 40, 54, computer readable medium 22, 52, and processors 20, 50 may be communicatively coupled through a system bus, mother board, or using any other suitable manner as will be understood by one of ordinary skill in the art.

Although the invention has been shown and described with respect to certain exemplary embodiments, it is obvious that equivalents and modifications will occur to others skilled in the art upon the reading and understanding of the specification. It is envisioned that after reading and understanding the present invention those skilled in the art may envision other processing states, events, and processing steps to further the objectives of system of the present invention. The present invention includes all such equivalents and modifications, and is limited only by the scope of the following claims.

What is claimed is:

1. An apparatus for improving automated matching of user inputted text to a database of text strings, the apparatus comprising:
   an input device configured to receive the user inputted text;
   a memory electrically connected to the input device, said memory storing the user inputted text and the database of the text strings;
   a processor, electrically connected to the memory and to the input device, where the processor is configured to accept the user inputted text and place the user inputted text in the memory, and then loop through each text string in the database, comparing a Levenshtein distance between the text string and the user inputted text, and
   if the Levenshtein distance is zero, a match is outputted by the processor;
   if the Levenshtein distance is greater than or equal to a Levenshtein threshold value, continuing the loop of each text string with a next text string in the database; and if the Levenshtein distance is less than the Levenshtein threshold value, looping through each character of the text string and the user inputted text until a mismatch between a text string character and a user inputted text character is found, and determining a keyboard distance between the text string character and the user inputted text character,
    if the keyboard distance is greater than or equal to a keyboard distance threshold, continuing the loop of each text string with the next text string in the database;
    if the keyboard distance is less than the keyboard distance threshold, continuing the loop through each character of the text string and the user inputted text;
    until each character of the text string and the user inputted text has been compared, upon which a match is outputted by the processor;
until each text string in the database is compared, upon which a non-match is outputted by the processor.

2. The apparatus of claim 1 wherein the input device is a network interface card.

3. The apparatus of claim 1 wherein the input device is a keyboard.

4. The apparatus of claim 1, wherein during comparison of the user inputted text and the database of the text strings, the user inputted text and the text string are segmented into individual words and the Levenshtein distance is determined for the individual words separately.

5. The apparatus of claim 4, wherein the Levenshtein distance is determined for each word of the user inputted text with respect to each word of the text string to determine an optimal matching of the words in the user inputted text to the words in the text string such that a sum of the Levenshtein distance for the optimal matching is a minimum compared to the sum of the Levenshtein distance for other matching of the user inputted text and the text string.

6. The apparatus of claim 5, wherein the determining the optimal matching including combining one or more of the words in the user inputted text and the words in the text string.

7. The apparatus of claim 1, wherein:
the user inputted text and each of the database of the text strings include multiple strings corresponding to multiple fields, wherein each string of the multiple strings corresponds to a field of the multiple fields; and
the user inputted text is compared to a plurality of text strings including the user inputted text in a given text field to the text string in a same given text field.

8. The apparatus of claim 7, wherein a maximum difference threshold and/or a maximum keyboard distance threshold is increased based on a number of different fields in which a match is found between the user inputted text and the text string.

9. The apparatus of claim 1, wherein prior to identifying the user inputted text and the text string as a match when the keyboard distance determined for each mismatching character pair is less than a maximum keyboard distance threshold, determining whether a sum of all of the keyboard distances determined for each mismatching character pair is less than a maximum total keyboard distance threshold and, only when the sum of all of the keyboard distances is less than the maximum total keyboard distance threshold, identifying the user inputted text and the text string as a match.

10. The apparatus of claim 1, wherein the comparison between the text string character and the user inputted text character further includes combining two characters within the user inputted text into a single character to account for the user mistakenly hitting two keys when attempting to press one key when the two characters are located adjacent one another on the keyboard and the two characters are located adjacent to one another in the user inputted text.

11. A method for improving automated matching of user inputted text to a database of text strings, the method comprising:
accepting the user inputted text by a processor from an input device;
placing, by the processor, the user inputted text in a memory;
looping through each text string in the database of the text strings stored in the memory;
    comparing, within the loop of each text string in the memory, a Levenshtein distance between the text string and the user inputted text, and
        if the Levenshtein distance is zero, outputting a match by the processor;
        if the Levenshtein distance is greater than or equal to a Levenshtein threshold value, continuing the loop of each text string with a next text string in the database; and
        if the Levenshtein distance is less than the Levenshtein threshold value, looping through each character of the text string and the user inputted text until a mismatch between a text string character and a user inputted text character is found, and determining a keyboard distance between the text string character and the user inputted text character,
            if the keyboard distance is greater than or equal to a keyboard distance threshold, stopping the loop through each character of the text string and the user inputted text and continuing the loop of each text string with the next text string in the database;
            if the keyboard distance is less than the keyboard distance threshold, continuing the loop through each character of the text string and the user inputted text;
            until each character of the text string and the user inputted text has been compared, then outputting a match the processor;
until each text string in the database is compared, the outputting a non-match by the processor.

12. The method of claim 11, wherein during comparison of the user inputted text and the text strings in the database, the user inputted text and the text string are segmented into individual words and the Levenshtein distance is determined for the individual words separately.

13. The method of claim 12, wherein the Levenshtein distance is determined for each word of the user inputted text with respect to each word of the text string to determine an optimal matching of the words in the user inputted text to the words in the text string such that a sum of the Levenshtein distance for the optimal matching is a minimum compared to a sum of the Levenshtein distance for other matching of the user inputted text and the text string.

14. The method of claim 13, wherein the determining the optimal matching including combining one or more of the words in the user inputted text and the words in the text string.

15. The method of claim 11, wherein:
the user inputted text and each of a plurality of text strings include multiple strings corresponding to multiple fields, wherein each string of the multiple strings corresponds to a field of the multiple fields; and comparing the user inputted text to the plurality of text strings includes comparing the user inputted text in a given text field to the text string in a same given text field.

16. The method of claim 15, wherein a maximum difference threshold and/or a maximum keyboard distance threshold is increased based on a number of different fields in which a match is found between the user inputted text and the text string.

17. The method of claim 11, further comprising accessing a secondary database storing a plurality of synonyms stored in the memory, wherein each synonym comprises a replacement string corresponding to a main string, wherein:

comparing the user inputted text and the text string further comprises generating at least one replacement text string;

the at least one replacement text string is generated by replacing at least one portion of the text string that matches the main string with the corresponding replacement string;

the user inputted text and the text string are determined to match if the user inputted text matches either the text string or the at least one replacement text string.

18. The method of claim 17, wherein:

the user inputted text and each of the plurality of text strings include multiple strings corresponding to multiple fields, wherein each string of the multiple strings corresponds to a field of the multiple fields;

comparing the user inputted text to the plurality of text strings includes comparing the user inputted text in a given text field to the text string in a same given text field;

when a total number of fields in which an exact match is found between the user inputted text, any field in which the user inputted text is determined to match the text string and the match is not an exact match, the user inputted text for the field is stored as a synonym for the text string for the field.

19. The method of claim 11, wherein prior to identifying the user inputted text and the text string as a match when the keyboard distance determined for each mismatching character pair is less than a maximum keyboard distance threshold, determining whether a sum of all of the keyboard distances determined for each mismatching character pair is less than a maximum total keyboard distance threshold and, only when the sum of all of the keyboard distances is less than the maximum total keyboard distance threshold, identifying the user inputted text and the text string as a match.

20. The method of claim 11, the comparison further including, within the user inputted text, combining two characters into a single character to account for a user mistakenly hitting two keys when attempting to press one key when the two characters are located adjacent one another on the keyboard and the two characters are located adjacent to one another in the user inputted text.

* * * * *